United States Patent [19]

Cha

[11] Patent Number: 5,701,794
[45] Date of Patent: Dec. 30, 1997

[54] BRAKE BOOSTER PROVIDED WITH A NOISE SHIELDING MEMBER

[75] Inventor: Hang-Byong Cha, Pyungtaek-shi, Rep. of Korea

[73] Assignee: Mando Machinery Corp., Kyunggi-Do, Rep. of Korea

[21] Appl. No.: 699,742

[22] Filed: Aug. 20, 1996

[30] Foreign Application Priority Data

Dec. 19, 1995 [KR] Rep. of Korea ............... 95-52058

[51] Int. Cl.⁶ ................................................. F15B 9/10
[52] U.S. Cl. .......................... 91/376 R; 181/230; 181/258
[58] Field of Search ..................... 91/376 R; 181/230, 181/258

[56] References Cited

U.S. PATENT DOCUMENTS

| | | | |
|---|---|---|---|
| 4,716,814 | 1/1988 | Yamakoshi | 91/376 R |
| 4,885,979 | 12/1989 | Macht et al. | 91/376 R |
| 5,090,294 | 2/1992 | Endou | 91/376 R |

*Primary Examiner*—F. Daniel Lopez
*Attorney, Agent, or Firm*—Anderson Kill & Olick P.C.

[57] ABSTRACT

A brake booster includes a valve housing, an input rod movably mounted in the valve housing, a main filter, a noise absorbing member, a spring seat, a return spring for biasing the input rod, and a noise shielding member. The main filter, the noise absorbing member, the spring seat, the noise shielding member are fixed on the input rod and move integrally with the latter. The noise shielding member spaced apart from the noise absorbing member reduces the air suction noise.

4 Claims, 4 Drawing Sheets

Y:60.0dB ref 20.0 μU RMS 40dB
X:0Hz +12.8KHz LIN
TOTAL:70.4dB/Yref

Y:60.0dB ref 20.0 μU RMS 40dB
X:0Hz +12.8KHz LIN
TOTAL:63.1dB/Yref

Y:70.0dB ref 20.0 μU RMS 40dB
X:0Hz +12.8KHz LIN
TOTAL:78.4dB/Yref

Y:70.0dB ref 20.0 μU RMS 40dB
X:0Hz +12.8KHz LIN
TOTAL:70.4dB/Yref

BRAKE BOOSTER PROVIDED WITH A NOISE SHIELDING MEMBER

FIELD OF THE INVENTION

The present invention relates to a brake booster; and, more particularly, to a brake booster capable of reducing an air suction noise without degrading the performance thereof.

DESCRIPTION OF THE PRIOR ART

A typical brake booster, which is known in the art of pneumatic brake systems, is constructed such that a power piston for reciprocating motion is slidably mounted in a housing and is adapted to urge a master cylinder piston therein. When the brake is applied, an input rod is moved and urges an air valve, thereby opening a passage for the air to pass therethrough and into a variable pressure chamber, resulting in a pressure difference between the variable pressure chamber and a constant pressure chamber or vacuum chamber. The pressure difference allows the power piston to move toward and urge the master cylinder piston.

In such a brake booster, a relatively high level of air suction noise is produced at the time when the air is rapidly sucked into the variable pressure chamber. Accordingly, various means have been developed and employed in the brake boosters for reduce the air suction noise.

There is shown in FIG. 1 a schematic partial cross sectional view of a conventional brake booster.

The conventional brake booster includes a valve housing 1, an input rod 2, a filter 3, a noise absorbing member 4, a return spring 5 and a spring seat 6.

The input rod 2 is connected to a brake pedal (not shown) at one end and movably mounted in the valve housing 1. The input rod 2 reciprocates in a longitudinal direction thereof in response to an operation of the brake pedal.

The spring seat 6, the noise absorbing member 4 and the filter 3 are fixed on the input rod 2, in order, from a noise source and move integrally with the input rod 2. The return spring 5 urges the spring seat 6, thereby biasing the input rod 2 toward the right in FIG. 1.

In such a conventional device, since the noise absorbing member 4 abuts the spring seat 6, it is not very effective in shielding the air suction noise.

Its effectiveness in shielding the air suction noise may be improved by increasing the thickness of the noise absorbing member. However, this would result in making the air to flow pass therethrough difficult, which would, in turn, degrade the performance of the brake booster and result in a delay in the braking response.

Furthermore, there is disclosed in U.S. Pat. No. 4,716,814 a muffler device for reducing the air suction noise. However, its construction is rather complicated, thereby increasing the production cost thereof.

SUMMARY OF THE INVENTION

It is, therefore, a primary object of the invention to provide a brake booster capable of effectively reducing the air suction noise without degrading the performance thereof.

In accordance with one aspect of the present invention, there is provided a brake booster comprising: a valve housing; an input rod movably mounted in the valve housing; an air valve mounted in the valve housing, the air valve being opened by the input rod urging it; a main filter fixed on the input rod; a noise absorbing member fixed on the input rod; a spring seat fixed on the input rod; a return spring for biasing the input rod, the return spring urging the spring seat; and a noise shielding member fixed on the input rod, the noise shielding member spaced apart from the noise absorbing member toward a noise source, wherein the main filter, the noise absorbing member, the spring seat, the noise shielding member move integrally with the input rod.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Figure 2:
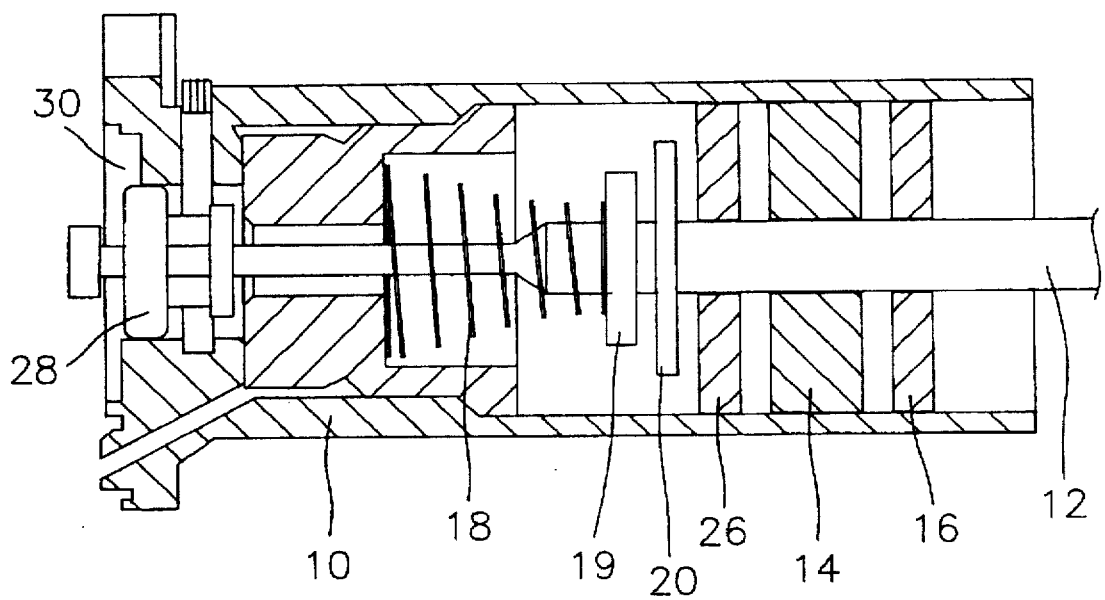
FIG. 2 depicts a schematic partial cross sectional view of a brake booster in accordance with a preferred embodiment of the present invention.

There is shown in FIG. 2 a schematic partial cross sectional view of a brake booster in accordance with a preferred embodiment of the present invention.

The inventive brake booster includes a valve housing 10, an input rod 12 connected to a brake pedal (not shown) at one end, a noise absorbing member 14, a main filter 16, a secondary filter 26, a noise shielding member 20, a return spring 18, a spring seat 19, and an air valve 28.

The input rod 12 is movably mounted in the valve housing 10, reciprocating in the longitudinal direction thereof in response to an operation of the brake pedal.

The air valve 28 is mounted in the valve housing 10 and is opened by the input rod urging it.

The spring seat 19, noise shielding member 20, the secondary filter 26, the noise absorbing member 14 and the main filter 16 are, in order, fixed on the input rod 12 from the air valve 28 and move integrally with the input rod 12. The noise shielding member 20 is spaced apart from the noise absorbing member 14.

The return spring 18 urges the spring seat 19, thereby biasing the input rod 12 toward the right in FIG. 2 so that the input rod 12 returns to an initial position thereof when the brake pedal is released.

Figure 3:
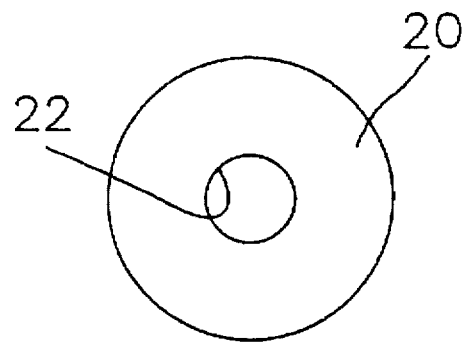
FIG. 3 sets forth a front view of the noise shielding member in FIG. 2.

Referring to FIG. 3, the noise shielding member 20 is shaped into a circular plate with an aperture 22 at its center into which the input rod 12 is fitted.

Operation of the brake booster of the present invention will now be described with reference to FIG. 2.

Figure 4:
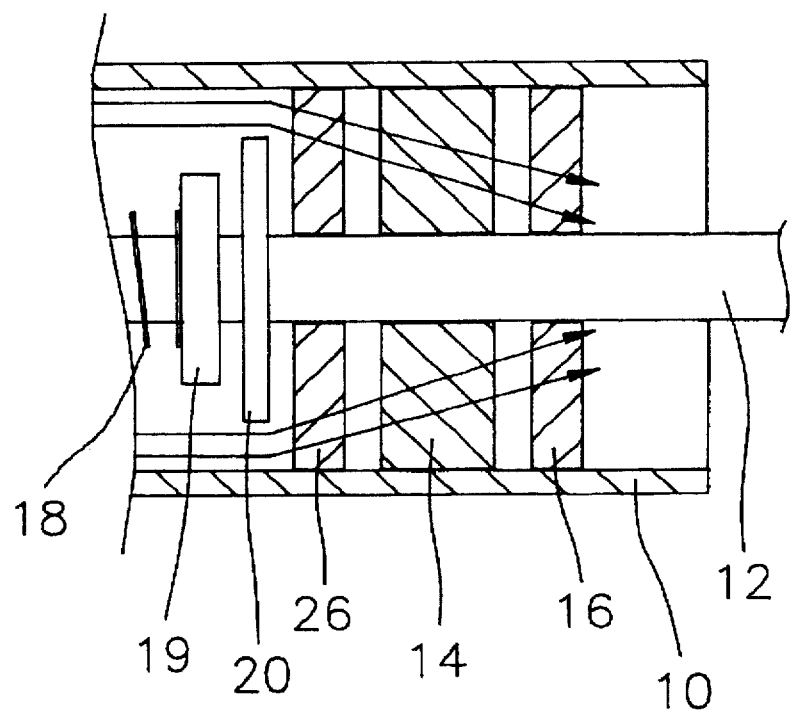
FIG. 4 presents a noise path in the brake booster of the present invention.

When the brake is applied, the input rod 12 is moved to the left and urges the air valve 28 so that the air valve 28 is moved, thereby an air port 30 is opened and the air passes therethrough and into a variable pressure chamber (not shown). At that time, an air suction noise is produced. The noise is first shielded by the noise shielding member 20, while the unshielded noise is then diffracted through an opening between the noise shielding member 20 and the housing 10 and absorbed into the noise absorbing member 14, as shown in FIG. 4.

Figure 1:
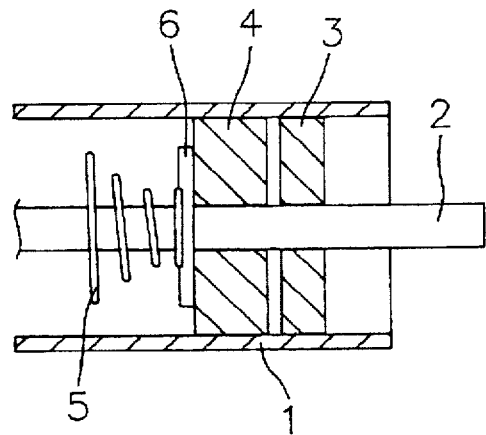
FIG. 1 represents a schematic partial cross sectional view of a conventional brake booster.
Figure 5A:
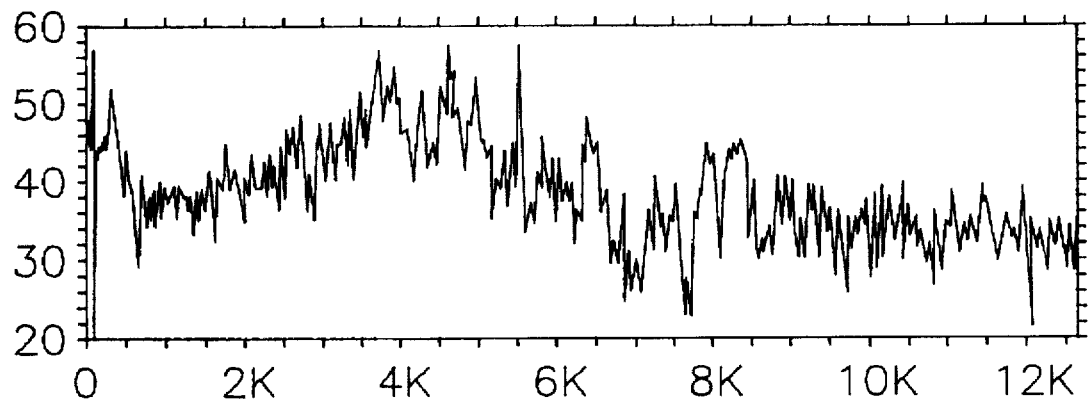
FIGS. 5A and 5B are graphs showing the noise levels as a function of the frequency for the conventional brake booster in FIG. 1 and the inventive brake booster in FIG. 2, respectively, under a normal braking.
Figure 5B:
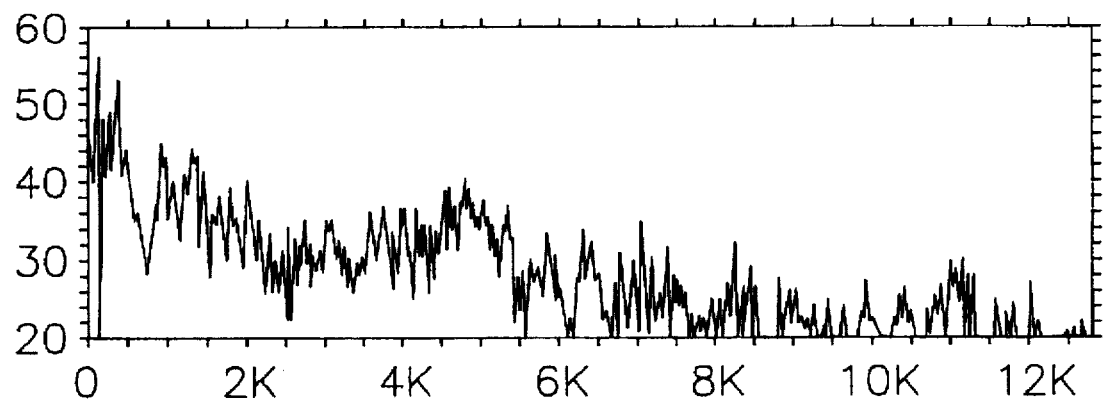
Figure 6A:
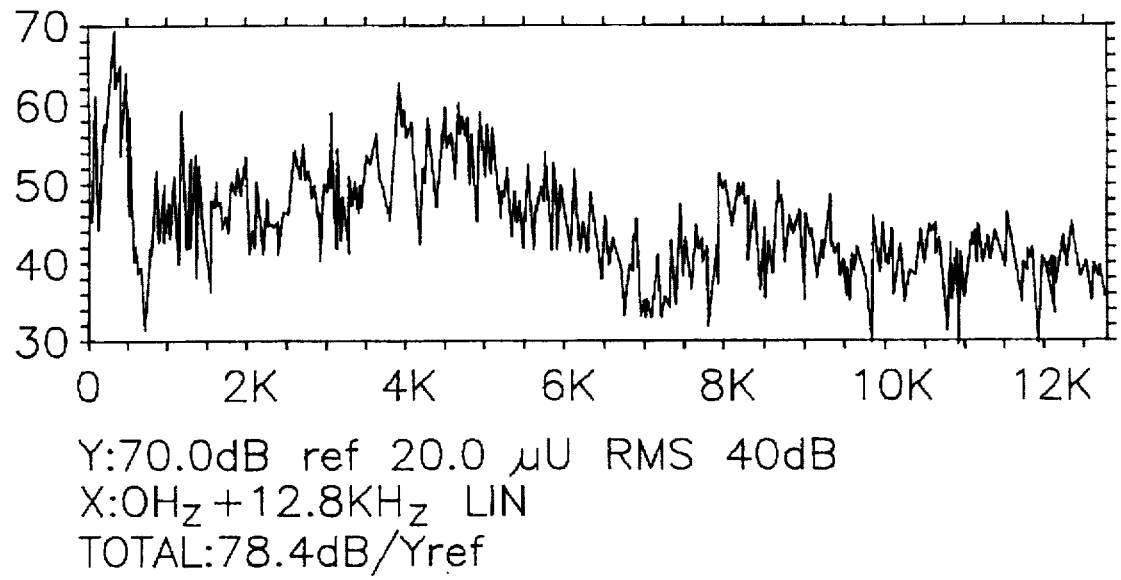
FIGS. 6A and 6B are graphs showing the noise levels as a function of the frequency for the conventional brake booster in FIG. 1 and the inventive brake booster in FIG. 2, respectively, under an abrupt braking.
Figure 6B:
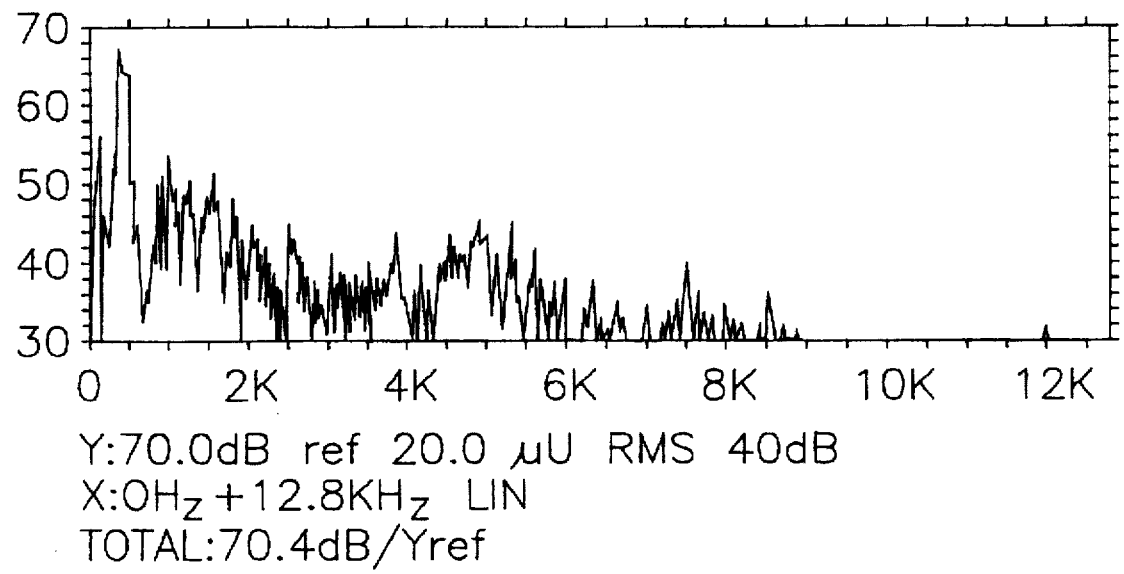

FIGS. 5A and 5B show the noise levels as a function of the frequency for the conventional brake booster of FIG. 1 and the brake booster of the present invention with the noise shielding member 20 spaced apart by 3 mm from the noise absorbing member 14, respectively, under a normal braking and FIGS. 6A and 6B, those under an abrupt braking, for the same. In the above test, a B&K 4165 Microphone and a B&K 2235 Sound Level Meter were used as a measuring apparatus, and a B&K 2032 FFT Analyzer was used as an analyzer. The air suction noise was measured at a position being 15 cm away from an end of a brake booster boot.

As seen from the test results, it was found that in the brake booster of the present invention, the noise was reduced by about 7.3 dB during the normal braking and by about 4 dB during the abrupt braking. It is believed that the noise shielding member 20 spaced apart from the noise absorbing member 14 improves the effectiveness in shielding the air suction noise in the latter.

Although the invention has been shown and described with respect to the preferred embodiments, it will be understood by those skilled in the art that various changes and modifications may be made without departing from the spirit and scope of the invention as defined in the following claims.

What is claimed is:

1. A brake booster comprising:

a valve housing;

an input rod movably mounted in the valve housing;

an air valve mounted in the valve housing, the air valve being opened by the input rod;

a main filter fixed on the input rod;

a noise absorbing member fixed on the input rod;

a spring seat fixed on the input rod;

a return spring for biasing the input rod, the return spring contacting the spring seat; and a noise shielding member fixed on the input rod, the noise shielding member spaced apart from the noise absorbing member toward the air valve, wherein the main filter, the noise absorbing member, the spring seat, the noise shielding member move integrally with the input rod.

2. The brake booster of claim 1, further comprising: a secondary filter fixed, between the noise absorbing member and the noise shielding member, on the input rod, the secondary filter moving with the input rod.

3. The brake booster of claim 2, wherein the spring seat, the noise shielding member, the secondary filter, the noise absorbing member and the main filter are fixed in order on the input rod from the air valve.

4. The brake booster of claim 1, wherein the noise shielding member is made of steel.

* * * * *